United States Patent [19]
Akihisa et al.

[11] Patent Number: 5,397,220
[45] Date of Patent: Mar. 14, 1995

[54] CANNED MOTOR PUMP

[75] Inventors: Kazumi Akihisa; Takehiro Takashima, both of Himeji, Japan

[73] Assignees: Nippon Shokubai Co., Ltd.; Teikoku Electric Manufacturing Co., Ltd., both of Osaka, Japan

[21] Appl. No.: 102,197

[22] Filed: Aug. 5, 1993

[30] Foreign Application Priority Data

Mar. 18, 1993 [JP] Japan .................... 5-58654

[51] Int. Cl.$^6$ .............................................. F04B 39/06
[52] U.S. Cl. ................................. 417/369; 417/DIG. 1
[58] Field of Search ................. 417/369, 370, DIG. 1

[56] References Cited

U.S. PATENT DOCUMENTS

| | | | |
|---|---|---|---|
| 3,115,839 | 12/1963 | Pollak et al. | 417/369 |
| 3,572,976 | 3/1971 | Sato | 417/369 |
| 4,487,557 | 12/1984 | Ruyak et al. | 417/DIG. 1 |
| 4,616,980 | 10/1986 | Carpenter | 417/369 |
| 4,770,550 | 9/1988 | Takahashi | 384/495 |
| 4,806,080 | 2/1989 | Mizobuchi et al. | 417/353 |
| 4,808,087 | 2/1989 | Tsutsui et al. | 417/369 |
| 4,893,387 | 1/1990 | Akamatsu et al. | 29/121.1 |
| 5,009,963 | 4/1991 | Ohmi et al. | 428/472.2 |
| 5,064,298 | 11/1991 | Hibi et al. | 384/625 |
| 5,139,393 | 8/1992 | Sulmone | 417/370 |
| 5,150,974 | 9/1992 | Tamada et al. | 384/463 |
| 5,246,509 | 9/1993 | Kato et al. | 148/434 |

*Primary Examiner*—Richard A. Bertsch
*Assistant Examiner*—Roland G. McAndrews, Jr.
*Attorney, Agent, or Firm*—Oblon, Spivak, McClelland, Maier & Neustadt

[57] ABSTRACT

A canned motor pump having an enclosing casing on the inside of a stator and a rotor on the inside of the enclosing casing, in which the interior parts of the enclosing casing communicates with the interior parts of a pump. Surfaces of supported portions on a shaft of the rotor which are contacted with the liquid flowing on the inside of the enclosing casing are treated by electrolytic polishing so that a liquid liable to polymerization or an adherent liquid can normally circulate as a circulating liquid for cooling a motor, and furthermore supporting portions which support the shaft contain bearings produced from fluororesin or glass-fiber reinforced fluororesin.

5 Claims, 3 Drawing Sheets

CANNED MOTOR PUMP

BACKGROUND OF THE INVENTION

The present invention relates to a canned motor pump having no shaft seal part.

A canned motor pump which is a kind of leakless pumps of a prior art has, unlike pumps in general use, no shaft seal part for restricting liquid leakage at a shaft area of a pump casing in which the pump shaft is mounted through. For example, as shown in FIG. 3, the canned motor pump comprises a pump casing 40, a frame 41 connected to the pump casing 40, a stator 42 housed in the frame 41, a stator can 43 hermetically enclosing the stator 42 in a canned condition, a rotor can 44 hermetically enclosing a rotor, bearings 46 and 47 supporting a shaft 45 of the rotor, an impeller 48 secured on one end of the shaft 45, and a circulating pipe 51.

The circulating pipe 51 is provided for leading a part of a liquid to be discharged from a casing flange 49 part into the inside of the motor, or the inside of the stator can 43. In this type of canned motor pump, a part of the liquid being handled is circulated as a circulating liquid in the motor, for the purposes of lubricating and cooling the bearings 46 and 47, and of cooling the motor coil with heat generation.

In case of a canned motor pump of such a constitution, the liquid handled will not leak out, and therefore the canned motor pump is suitable for handling a deleterious liquid for the human body, an explosive or inflammable liquid, and corrosive liquid. Also, since no outside air is drawn in, the canned motor pump is suitable for operation in a vacuum system and for use in handling a liquid which is likely to deteriorate it's quality when exposed to the outside air. This type of pump, therefore, has wide applications in the chemical, nuclear power, and energy industries.

This known canned motor pump, however, when a liquid liable to polymerization, for example an acrylic monomer, a liquid including a polymer, or a liquid including an adherent substance is handled, there takes place, during operation, a polymerization reaction or the increase of the viscosity in a circulating liquid owing to a frictional heat occurring at the pump shaft bearing part and/or heat produced at the motor coils. In consequence, there arises such a problem that the circulating liquid for cooling the motor falls to circulate normally. Provided that the liquid fails in normal circulation as described above, it becomes necessary to stop pump operation once to provide a cooling period. Once the pump is stopped, the whole system will be greatly affected. To cope with this problem, therefore, there has been demanded a canned motor pump which is capable of controlling heat generation stated above.

OBJECTS AND SUMMARY OF THE INVENTION

In view of the above-described problems of the prior-art canned motor pump, the present invention has as its object the provision of a canned motor pump which can normally circulate a liquid liable to polymerization or an adherent liquid as a circulating liquid for cooling the motor.

To achieve the object, the present invention provides the canned motor pump having an enclosing casing on the inside of a stator and a rotor in said enclosing casing, the interior parts of said enclosing casing communicating with the interior parts of a pump, wherein surfaces of supported portions on a shaft of said rotor which are contacted with the liquid flowing on the inside of said enclosing casing have been treated by electrolytic polishing.

Supporting parts which support the shaft may be contained bearings produced of fluororesin or glass-fiber reinforced fluororesin.

The canned motor pump may be constituted of a circulation-type canned motor pump having a circulating pipe which connects the discharge port of the pump casing to the interior parts of the enclosing casing, furthermore, a cooling means may be provided on the way of a circulating line of the circulating pipe.

It is desirable that the inside diameter of the circulating pipe and/or a clearance between the outside wall of a rotor can of the canned motor pump and the inside wall of the stator can be determined in accordance with the quantity of the circulating liquid which can normally circulating.

According to the present invention, as described above, the liquid flowing in the enclosing casing contacts the surface of the supported part of the rotor shaft which has been treated by electrolytic polishing, therefore when the canned motor pump is operated, the frictional heat of the liquid flowing in contact with the surface of the supported part of the rotor shaft is controlled, thereby stabilizing the liquid flow and accordingly stabilizing supply of the circulating liquid for cooling the motor.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
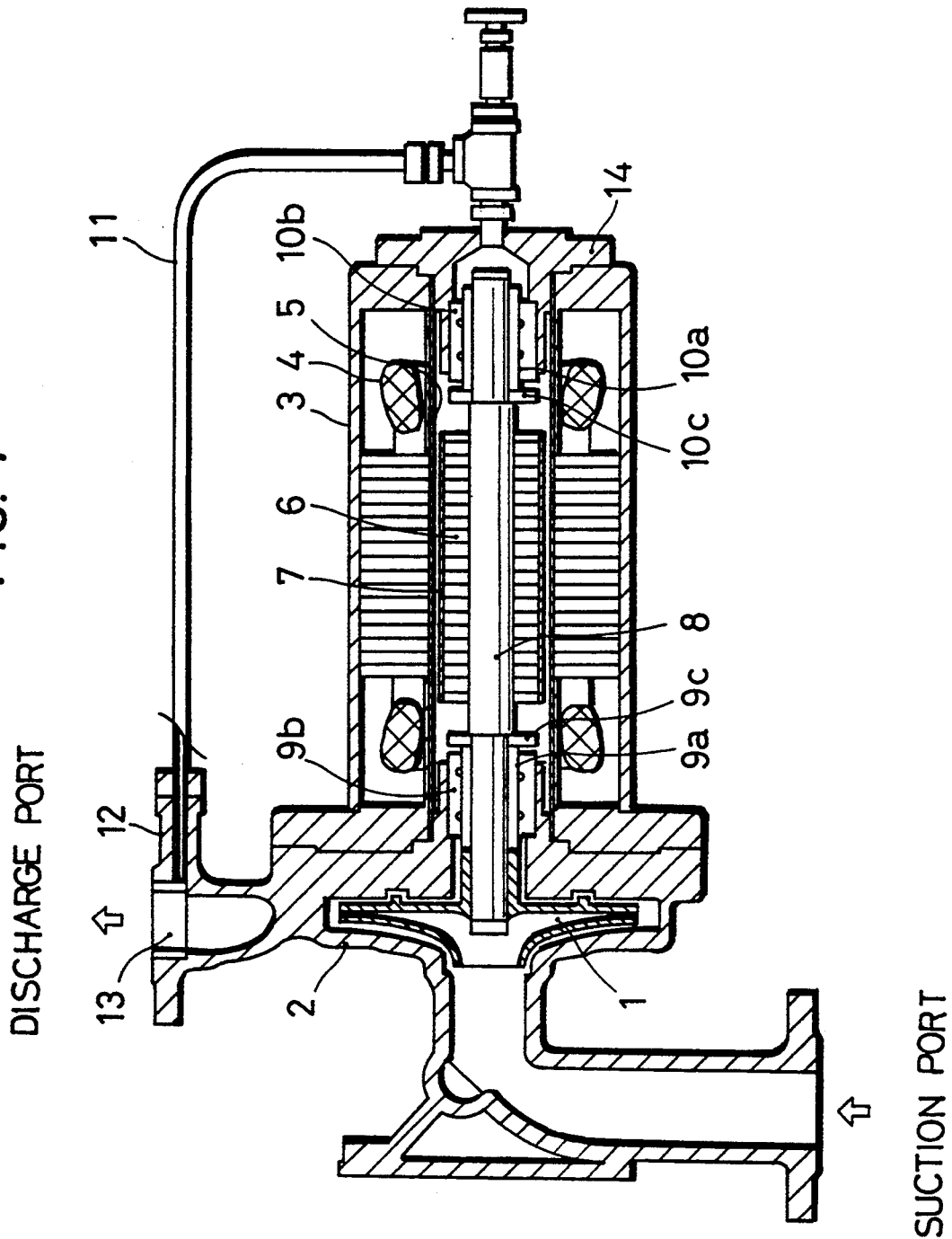
FIG. 1 is a sectional view showing the constitution of one embodiment of a canned motor pump according to the present invention.

Referring to FIG. 1, a pump casing 2 having suction and discharge ports and housing an impeller 1 inside, is connected to a cylindrical frame 3. Within this frame 3 is housed a motor part. The stator 4 in the motor part is fully sealed at the inner surface by a stator can 5 produced of a thin non-magnetic metal sheet, and at the side surface by a thick corrosion-resistant metal plate, thus being isolated to prevent the entrance of the liquid being handled into the stator 4. In the present embodiment, the liquid handled should be an acrylic monomer.

The outer surface of a rotor 6 disposed inside the stator can 5 is also closed tightly by a rotor can 7 produced of a thin non-magnetic metal sheet, while the side surface is completely sealed by a thick corrosion-resistant metal plate, being isolated to prevent the entrance of the liquid being handled into the rotor 6. The thin non-magnetic sheet mentioned above is a stainless steel sheet to be concrete.

A shaft 8 of the rotor 6 is supported on a shaft bearing part. That is, the shaft 8 is supported by bearings 9b and 10b at their two contact points through shaft sleeves 9a and 10a. On one end of the shaft 8 is secured the impeller 1. Reference numerals 9c and 10c denote thrust collars. The above-mentioned shaft sleeves 9a and 10a and the thrust collars 9c and 10c, being made in a single-unit construction, may be regarded as a "supported part."

The surfaces of the shaft sleeves 9a and 10a and the thrust collars 9c and 10c have been finished by a composite electropolishing process to a surface roughness of about 0.5 mRmax. This composite electropolishing process is a polishing technique inclusive of a metal dissolution action by electrolysis and a mechanical fretting action by an abrasives. A polishing tool provided with electrodes and the abrasives alternately arranged is pressed, while turning, against a surface to be polished. A passivated film is produced by electrolysis on an irregular part of a metal surface to be polished, and high points in the passivated film are removed by the use of the abrasives until metal foundation appears, thus concentrating the electrolytic current to the high points to enable selective electrolytic dissolution. As a result, even a rough metal surface can be flat and made smooth, obtaining a mirror surface of extremely high quality and accordingly decreasing the amount of liquid adhering to the metal surface. Generally, in case of ordinary machine finish, the surface roughness obtained is of the order of 1.0 mRmax.

The bearings 9b and 10b previously stated are produced of glass-fiber reinforced fluororesin; thence both the supporting and supported portions of the shaft are so treated as to reduce the coefficient of friction of the liquid.

The circulating pipe 11 located above the frame 3 functions to lead a part of the discharged liquid from the casing flange 12 to the inside of the motor, or the inside of the stator can 5.

Next, the operation of the canned motor pump of the above-described constitution will be explained.

When the motor starts driving, the impeller 1 rotates. With the rotation of the impeller 1, the liquid to be handled is drawn in at the suction port and delivered out to the discharge port. At this time, a part of the liquid (hereinafter referred to as the "circulating liquid") is delivered from the casing flange 12 to the filter 13 to filter the circulating liquid. The circulating liquid thus filtered flows through within the circulating pipe into an RB housing 14. The circulating liquid that has been sent into the RB housing 14 then goes through a clearance between the bearing 10b and the shaft sleeve 10a which are rotating, then through a clearance between the stator can 5 and the rotor can 7, and subsequently through a clearance between the bearing 9b and the shaft sleeve 9a which are rotating, finally being sent to the low-pressure part of the inlet of the impeller 1 after passing through a balance wheel of the impeller 1.

During the above-described operation, the circulating liquid flows while contacting each part in the motor, lubricating and cooling the shaft bearing part to control the heat generation of the motor coil. As described above, because the surface of each member of the shaft bearing part has a very small coefficient of friction, the circulating liquid temperature will not rise not-withstanding the use of the acrylic monomer likely to polymerize the liquid being handled, allowing smooth liquid circulation.

Figure 2:
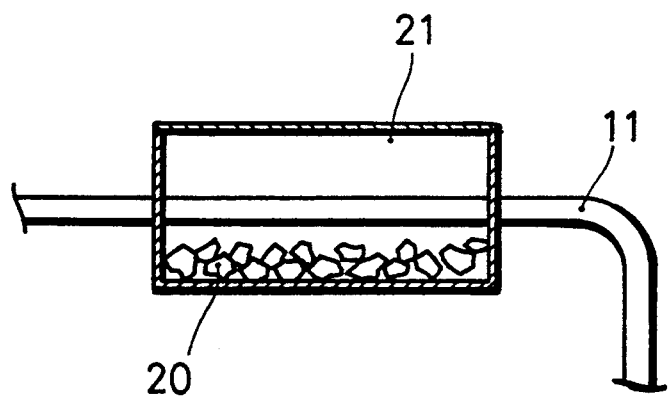
FIG. 2 is a sectional view showing the constitution of a cooling means provided in a circulating pipe of the same embodiment.
Figure 3:
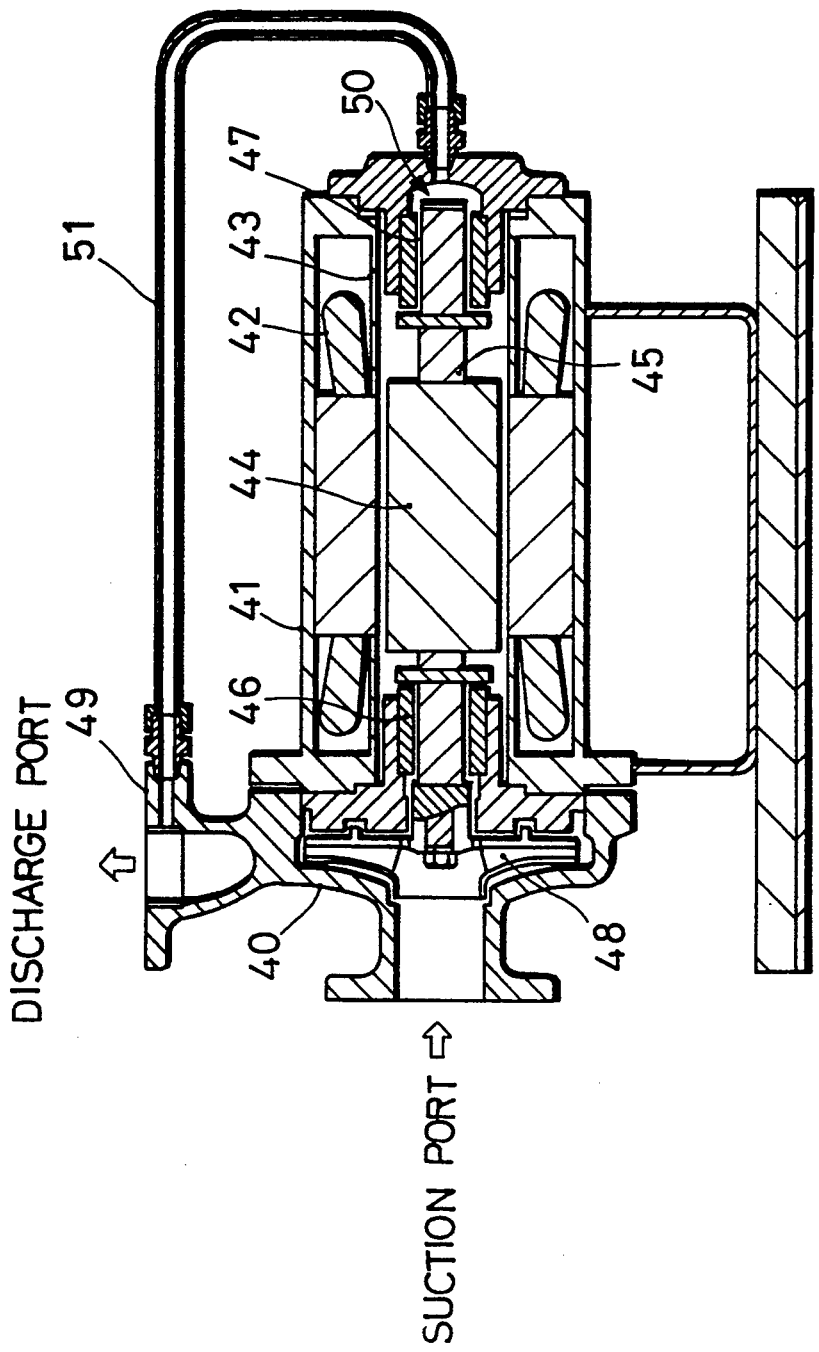
FIG. 3 is a sectional view showing the constitution of a prior-art canned motor pump.

FIG. 2 is another embodiment having a "cooling means" on the way of the circulating pipe 11. Concretely speaking, on the way of the circulating pipe 11 is mounted a casing 21 containing dry ice 20, by which the circulating liquid passing through in the circulating pipe 11 is cooled once within the casing 21 and then is led into the motor, or the inside of the stator can 5. According to this constitution, it is possible to further improve cooling efficiency of the motor. Other constitutions except for described above are similar to that shown in FIG. 1.

Furthermore, as a method for controlling heat generation at the motor coil and heat caused by the friction of the bearing part, in place of providing the above-mentioned cooling means, heat generation can be controlled by increasing the amount of the circulating liquid. That is, by increasing the inside diameter of the circulating pipe 11 or by widening the clearance between the rotor can 7 and the stator can 5 in the motor part, or by increasing the inside diameter of the circulating pipe 11 and widening the clearance between the rotor can 7 and the stator can 5. In this case, heat generation can be controlled effectively by setting the above-described inside diameter and/or the clearance in order that the amount of the circulating liquid will increase about 2.5% or more as a whole.

Furthermore, in the above-described embodiment of the present invention the supported parts are the shaft sleeve and the thrust collar. It is to be noted, however, that the supported parts are not limited only to these parts stated above but may be either one of the shaft sleeve and the thrust collar, and also may include an arbitrary member of the shaft parts supported on the bearings.

Furthermore, in the embodiment described above according to the present invention the supporting parts are produced of the glass-fiber reinforced fluororesin. It is, however, noticed that the material is not limited only to the glass-fiber reinforced fluororesin, but may be merely a fluororcsin or other arbitrary material if a low adherence, little coefficient of friction and sufficient strength for use as the bearings arc sufficed.

Furthermore, the refrigerant used in the above-described embodiment of the present invention is dry ice, but any other refrigerant such as an alternative Freon, argon, coolant etc., may be selected in accordance .with the type of circulating liquid used.

Furthermore, the liquid of the present invention handled is the acrylic monomer in the above-described embodiment, but is not limited only to the acrylic monomer and may be a liquid liable to polymerization reaction, a liquid including a polymer, and a liquid including an adherent substance.

As is apparent from the above explanation, the canned motor pump of the present invention can normally circulate the liquid liable to polymerization or an adherent liquid as a circulating liquid for cooling the motor. Therefore, the canned motor pump can be operated continuously with this type of liquid.

What is claimed is:

1. A canned motor pump comprising:
   a pump for pumping an easily polymerized liquid;
   a pump motor comprising a stator, an enclosing casing within said stator and a rotor within said enclosing casing, said rotor including a shaft having supported portions,
   wherein said pump motor is so configured that the easily polymerized liquid flows within said enclosing casing and into contact with said supported portions, and wherein said supported portions comprise composite electropolished elements having a surface roughness no higher than about 0.5 μm Rmax.

2. The canned motor pump of claim 1, wherein said supported portions are supported by bearings of said pump motor, said bearings comprising one from the group consisting of a fluororesin and a glass-fiber reinforced fluororesin.

3. A canned motor pump according to claim 1 or 2, wherein said canned motor pump is a circulation-type canned motor pump having a circulating pipe which connects a discharge port of a pump casing and the interior parts of said enclosing casing.

4. A canned motor pump according to claim 3, wherein a cooling means is provided in a circulating line of said circulating pipe.

5. A canned motor pump according to claim 3, wherein at least one of the inside diameter of said circulating pipe and a clearance between the outer wall of a rotor can and the inner wall of a stator can of said canned motor pump are sized in accordance with the amount of the circulating liquid flow.

* * * * *